United States Patent [19]
Oksanen et al.

[11] Patent Number: 5,854,977
[45] Date of Patent: Dec. 29, 1998

[54] CALL TRANSFER AND SIMPLEX CALL CAPABILITY IN A RESIDENTIAL SYSTEM USING WIRELESS RESIDENTIAL EXTENSION HANDSETS

[75] Inventors: Markku Oksanen, Salo, Finland; Juha Peranto, Irving, Tex.; Seppo Alanara, Hallituskatu, Finland; Teppo Jylanki, Oulu, Finland; Pekka Liukkonen, Euless, Tex.; Kalevi Malmi, Salo, Finland

[73] Assignee: Nokia Mobile Phones Limited, Salo, Finland

[21] Appl. No.: 584,333

[22] Filed: Jan. 11, 1996

[51] Int. Cl.$^6$ .................................................. H04Q 7/38
[52] U.S. Cl. ........................ 455/417; 455/414; 455/417; 455/426; 379/212
[58] Field of Search .................................. 455/414, 417, 455/426, 445, 461, 561, 552, 403, 422; 379/210, 211, 212, 207, 144

[56] References Cited

U.S. PATENT DOCUMENTS

| | | | |
|---|---|---|---|
| 5,627,877 | 5/1997 | Penttonen | 455/417 |
| 5,657,377 | 8/1997 | Pinard et al. | 379/212 |
| 5,706,329 | 1/1998 | Foladare et al. | 379/212 |
| 5,737,700 | 7/1998 | Cox et al. | 455/417 |

*Primary Examiner*—William Cumming
*Assistant Examiner*—Jean A. Gelin
*Attorney, Agent, or Firm*—Perman & Green, LLP

[57] ABSTRACT

A wireless communications system (1) has at least one base station, such as a personal base station (5), and a plurality of mobile stations (10) capable of wireless communications with the at least one personal base station. In response to input from a user of a first mobile station, a first step of a method transmits a message from the first mobile station to the personal base station, the message including a request for service and information specifying another mobile station. The message is received at the personal base station and the request for service is interpreted as being one of a plurality of types. In one embodiment the message is interpreted in accordance with a state of the mobile station when transmitting the message. By example, the request for service is interpreted as a request to establish a simplex connection between the first mobile station and another mobile station, when the first mobile station is in an idle state, or as a request to transfer an on-going call from the first mobile station to another mobile station, when the first mobile station is in a conversation state. A next step of the method contacts at least one other mobile station from the personal base station for one of establishing the simplex connection and transferring the on-going call.

49 Claims, 5 Drawing Sheets

CALL TRANSFER AND SIMPLEX CALL CAPABILITY IN A RESIDENTIAL SYSTEM USING WIRELESS RESIDENTIAL EXTENSION HANDSETS

FIELD OF THE INVENTION

This invention relates generally to wireless communications and, in particular, to the operation of a wireless residential extension handset, also referred to herein as a mobile station (MS), which is coupled to a personal base station (PB).

BACKGROUND OF THE INVENTION

As cellular communications has evolved it has become feasible to provide a single user terminal or MS that is operable in a wireless residential environment, in a cellular network environment, and also in a wireless PBX environment. Of most interest to this invention is the wireless residential environment (WRE), also referred to herein as an in-building environment.

When operating in the WRE it has been proposed that the MS function is a manner analogous to a conventional cordless telephone, enabling a user to move about a residence and its environs while making and receiving telephone calls. The residence is assumed to include or be within range of at least one PB that is connected to the local Public Switched Telephone Network (PSTN) or to some other network providing similar service. The PB may be thought of as a wireless extension of the home landline.

The MS automatically registers with the PB when in range. By example, when a user is outside of the home the MS functions as a conventional cellular telephone and registers with the cellular network through a conventional base station. When the user brings the MS into the home, and thus within range of the PB, the MS automatically registers with the PB.

A currently specified air protocol, known as IS-94 (5/94), provides implementation for a number of features in an auxiliary in-building system. These features include the identification of available frequencies by scanning, the use of a non-standard control channel to differentiate closed users from public users, and a MS preference for the in-building system to achieve least-cost call routing.

It has been proposed that a plurality of MSs could be in wireless communication with a single PB within the home. As such, it can be appreciated that there exists a need to provide a simple and efficient mechanism to enable a user to transfer an ongoing call to another MS that is registered with the same PB. It can also be appreciated that there exists a need to enable one MS to call another, via the PB.

OBJECTS OF THE INVENTION

It is a first object of this invention to provide a simple and efficient mechanism to enable a user to transfer an ongoing call from a first MS to a second MS that is registered with the same PB.

It is a further object of this invention to provide an in-building wireless communications system that provides an ability to transfer a call from one MS to another, and that also permits one MS to call another MS through the PB.

It is another object of this invention to provide an in-building wireless communications system that provides a simplex calling capability between MSs.

SUMMARY OF THE INVENTION

The foregoing and other problems are overcome and the objects of the invention are realized by methods and apparatus in accordance with embodiments of this invention. In accordance with a method of this invention, and a system implementing the method, a wireless communications system has at least one base station, such as a personal base station, and a plurality of mobile stations capable of wireless communications with the at least one personal base station. In response to input from a user of a first mobile station, a first step transmits a message from the first mobile station to the base station, the message including a request for service. A next step receives the message at the base station and interprets the request for service as being one of a first type of request and a second type of request, in accordance with a state of the first mobile station at a time that the message was transmitted. A next step performs the requested service in cooperation with at least one second mobile station. In one embodiment of this invention the message further includes information that specifies an identity of at least one second mobile station.

Further in accordance with this invention a method includes the following steps. In response to input from a user of a first mobile station, a first step transmits a message from the first mobile station to a personal base station, the message including a request for service and optionally includes information specifying another mobile station. The message is received at the personal base station and the request for service is interpreted as being one of a plurality of types in accordance with a state of the mobile station when transmitting the message. In a presently preferred embodiment of this invention the request for service is interpreted as a request to establish a simplex connection between the first mobile station and another mobile station, when the first mobile station is in an idle state, and is interpreted as a request to transfer an on-going call from the first mobile station to another mobile station, when the first mobile station is in a conversation state. A next step of the method contacts at least one other mobile station from the personal base station for one of establishing the simplex connection and transferring the on-going call.

During a simplex connection a transmitting mobile station transmits a sub-audible bit stream having a first bit pattern during the transmission and transmits a second bit pattern just prior to a transmitter of the mobile station being turned off. The personal base station is responsive to the second bit pattern for turning off a personal base station receiver audio so as to not couple transmitter switching and other noise through to the other mobile station.

In accordance with an aspect of this invention the information specifying another mobile station can specify a plurality of other mobile stations. In this case the personal base station pages a plurality of other mobile stations, and the simplex connection or the transfer of the on-going call is made with the first mobile station to answer the page.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
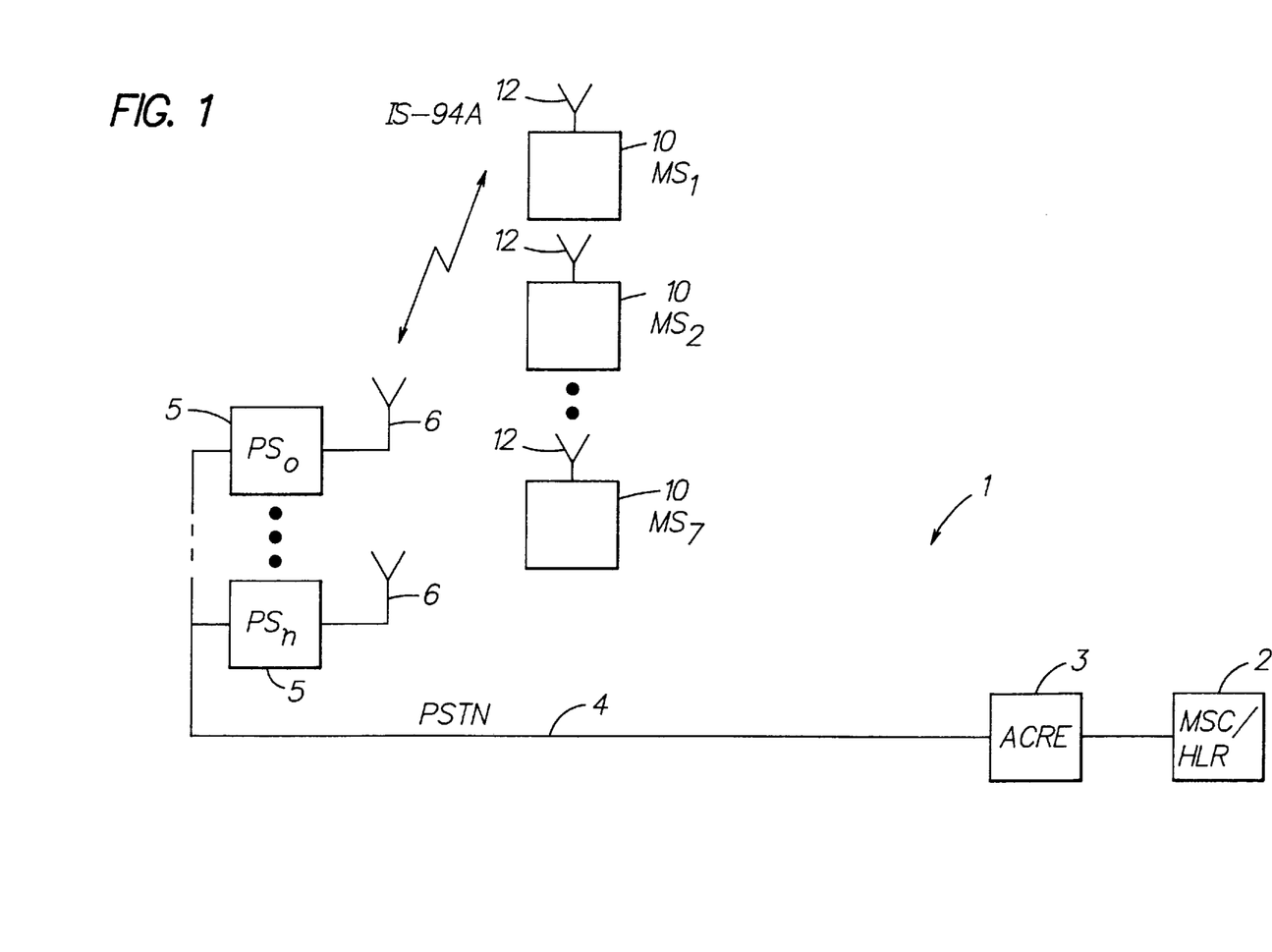
FIG. 1 is simplified block diagram of a telecommunications system that includes a plurality of PBs and a plurality of MSs.

Referring first to FIG. 1 there is illustrated a simplified block diagram of a telecommunications system 1 that includes a plurality of PBs 5 and a plurality of MSs 10. The system 1 includes a portion of a cellular network comprised of a conventional Mobile Switching Center (MSC) having a Home Location Register (HLR), referred to collectively as the MSC/HLR 2. Connected to the MSC/HLR 2 is an Authorization and Call Routing Equipment (ACRE) unit 3. The ACRE unit 3 is responsible for verifying an identity of the PBs 5 to which it is connected through the PSTN 4 and an appropriate wireline interface. The ACRE unit 3 further provides service authorization to the PBs 5 (per regulatory body rules), and also downloads RF and other programming parameters from the network to the PBs 5.

Each PB 5 includes an antenna 6 for communicating with a corresponding antenna 12 of each MS 10, and has an associated set of transmit and receive frequencies. It is assumed for this discussion that the PBs 5 are located within and/or adjacent to a building, such as a residence, office or the like, and have a limited range for servicing a restricted area. By example, one PB can service one family, in that the PB has the same phone number as the landline plug it is connected to. Additionally, cellular calls to the handsets of the WRE system can be forwarded to the landline number, when the handset has registered with the PB. Coverage of this type, in the case of a one-family residence, enables the use of the WRE handset throughout the residence, detached buildings, and grounds. Although a plurality of PBs are shown, only one need be provided for the purposes of this invention. The number of MSs may vary from one to, by example, seven. For the purposes of this invention it is assumed that there are at least two MSs 10.

Figure 2:
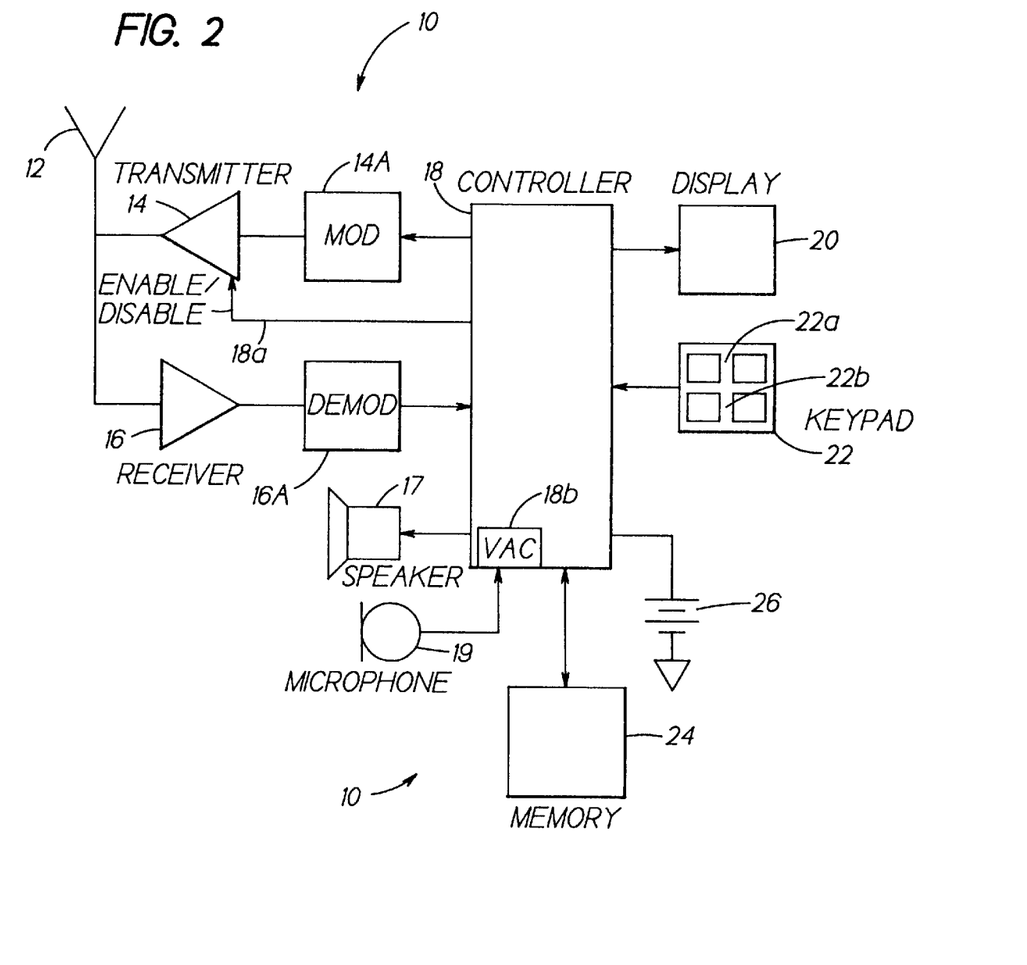
FIG. 2 is a simplified block diagram of one of the MSs of FIG. 1.
Figure 3:
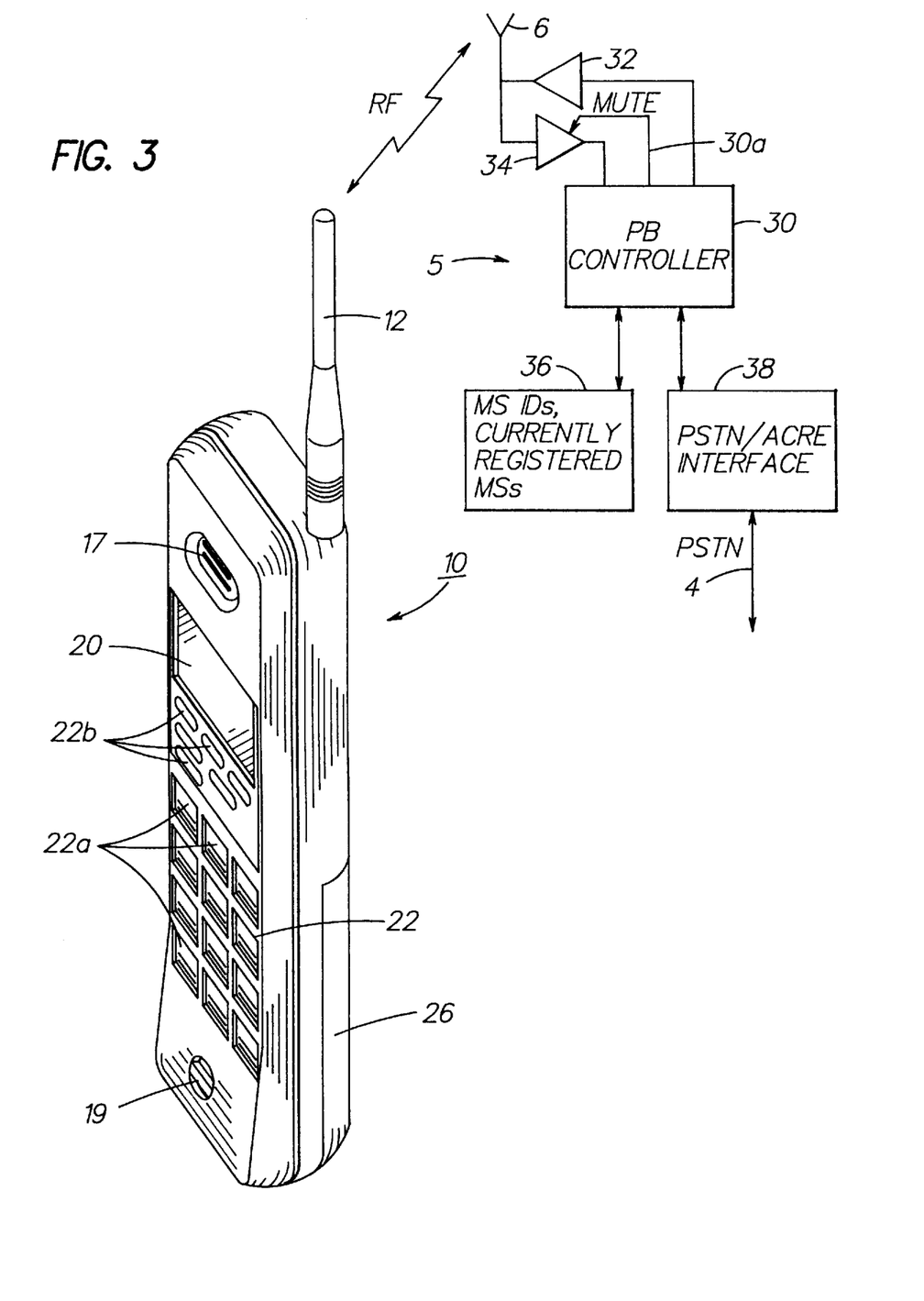
FIG. 3 illustrates the MS of FIG. 2, and also shows a simplified block diagram of one of the PBs of FIG. 1.

Reference is now made to FIGS. 2 and 3 for illustrating one of the MSs 10 of FIG. 1 that is suitable for practicing this invention. The MS 10 includes the antenna 12 for transmitting signals to and for receiving signals from one of a plurality of PBs 5. The MS 10 includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard can include a digital control channel (DCCH), or may be accomplished with an analog channel such as is provided in AMPS and NAMPS systems. One suitable air interface standard for call transfer is that specified by IS-91-A. The air interface standard could also be similar to AMPS (EIA/TIA-553), or NMT, or TACS. It should thus be realized that the teaching of this invention is not limited for use with only one particular air interface standard or standards.

It should further be realized this invention can be used in other than WRE environments. For example, the teachings of this invention can be employed to advantage in cordless telephone systems, including those that use dedicated channels from the cellular spectrum. In general, the teaching of this invention can be applied with advantage in residential (conventional cordless) and office cordless systems, which have no relationship to any cellular system.

A user interface of the MS 10 includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and also other keys 22b used for operating the MS 10. These other keys 22b may include, by example, a SEND key, various menu scrolling and soft keys, and a PWR key.

The MS 10 also includes various memories, shown collectively as the memory 24, wherein are stored a plurality of constants and variables that are used by the controller 18 during the operation of the mobile terminal. For example, the memory 24 stores the values of various cellular system parameters and the number assignment module (NAM). An operating program for controlling the operation of MS controller 18 is also stored in the memory 24 (typically in a ROM device). The memory 24 also stores data, including user messages, that are received from the network prior to the display of the messages to the user. The MS 10 has a battery 26 for powering the various circuits that are required to operate the terminal.

In general, the operating program in the memory 24 includes routines to present messages and message-related functions to the user on the display 20, typically as various menu items. The memory 24 also includes routines for implementing the methods described below in relation to FIGS. 4 through 6, in cooperation with the PB 5. In this regard, and referring to FIG. 3, the PB 5 includes the antenna 6 for communicating with the MS 10. The PB 5 is comprised of a PB controller 30 that is responsible for implementing the PB-related portion of the applicable air interface standard. Coupled to the PB controller 30 is a suitable modulating transmitter assembly 32, a demodulating receiver assembly 34, and a memory 36 storing a list of MS numbers and corresponding IDs, a list of MSs that are currently registered with the PB 5, a list of MSs that are currently authorized to use the PB 5, in addition to whatever other information is required during the operation of the PB controller 30. The PB 5 further includes a suitable PSTN/ACRE interface 38 (for an IS-91-A system) or just a PSTN interface for systems that do not employ the ACRE or a similar device.

Figures 4, 5:
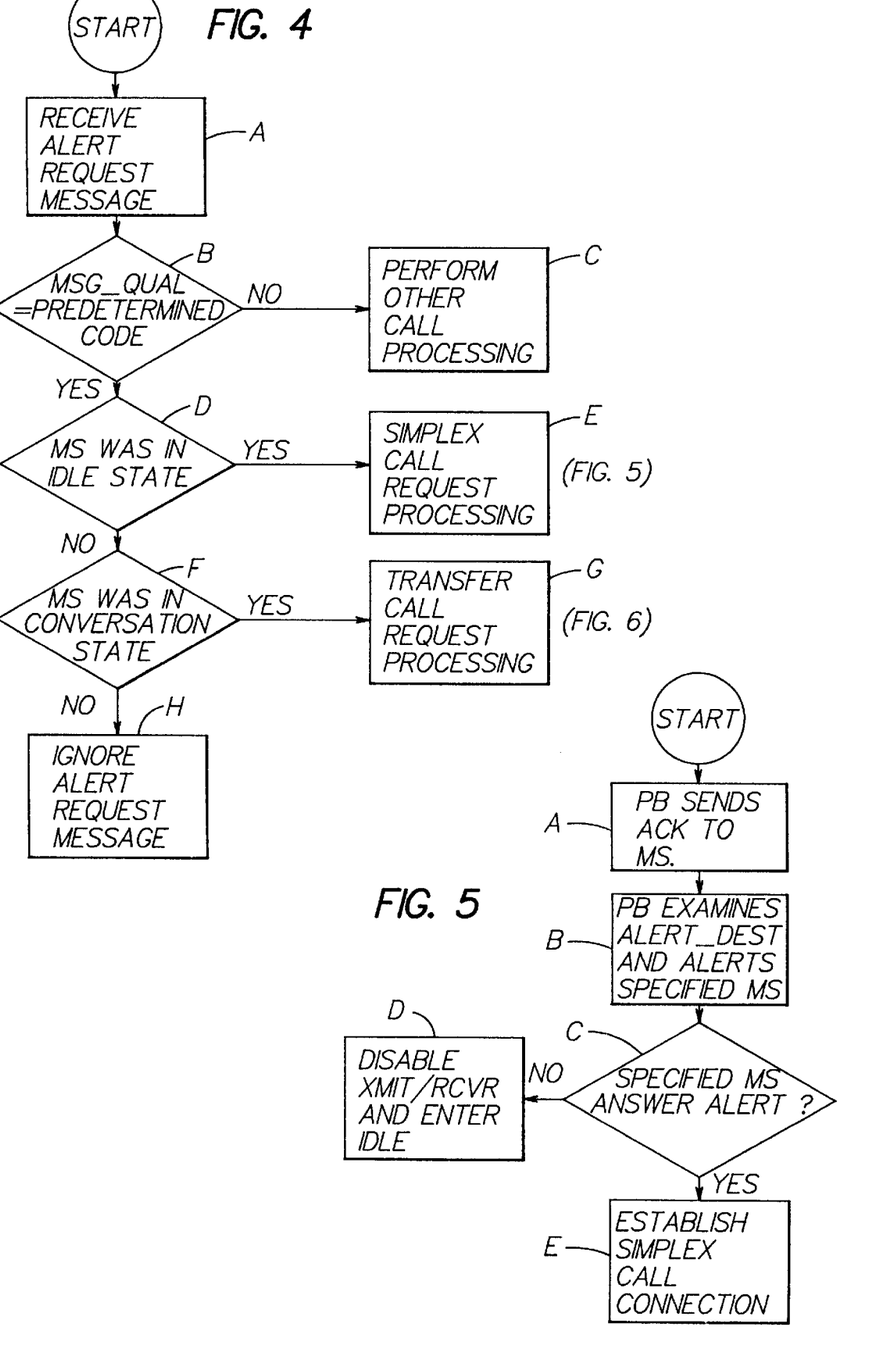
FIG. 4 is a logic flow diagram showing the operation of the PB of FIG. 3 when receiving an Alert Request Message from the MS.
FIG. 5 is a logic flow diagram illustrating an in-building simplex MS-MS calling method in accordance with this invention.

Reference is now made to FIG. 4 for illustrating a method executed by the PB controller 30. At Block A the PB controller 30 receives an Alert Request Message from one of the MSs 10. The Alert Request Message, in a presently preferred embodiment of this invention, is comprised of a plurality of fields. One of these fields, referred to as a Message Qualifier field, is a five bit field predetermined to include a specific code (e.g., 01001) to indicate one of a call transfer request and a simplex communication request. A second field, referred to as a Destination field, is a four bit field for identifying another MS to which an ongoing call is to be transferred or with which a simplex communication link is to be established. One suitable interpretation of the Destination field is as follows.

| Value | Interpretation |
|---|---|
| 0 | No MSs are being alerted |
| 1 | MS#1 is being alerted |

-continued

| Value | Interpretation |
| --- | --- |
| 2 | MS#2 is being alerted |
| 3 | MS#3 is being alerted |
| 4 | MS#4 is being alerted |
| 5 | MS#5 is being alerted |
| 6 | MS#6 is being alerted |
| 7 | MS#7 is being alerted |
| 8 | All MSs are being alerted |
| 9–15 | Reserved |

It should be noted that the foregoing Destination field and contents may also be used for other system functions which are not, however, germane to an understanding of the teachings of this invention.

At Block B the PB controller 30 examines the Message Qualifier field to determine if the specific code (e.g., 01001) is present. If not, control passes to Block C to perform other tasks that are not germane to the understanding of this invention. If Yes at Block B, control passes to Block D where the PB controller 30 determines if the MS 10 was in an Idle state (i.e., the MS was not engaged in a call when it started this service request task). If Yes, control passes to Block E (FIG. 5), where the Alert Request Message is interpreted as a simplex call request. If No at Block D, control passes to Block F where a determination is made if the MS 10 was in a Conversation state (i.e., the MS was engaged in a call when the message was sent). If Yes, control passes to Block G (FIG. 6), where the Alert Request Message is interpreted as a call transfer request. If No at Block F, the PB controller 30 ignores the Alert Request Message and enters the Idle state.

It should be noted that the MS 10 is capable of generating the Alert Request Message for a simplex call request or a call transfer request by one or just a few keystrokes. For example, depressing a numeric key (e.g., #3) results in the MS controller 18 generating the Alert Request Message with the predetermined code (e.g., 01001) in the Message Qualifier Field, and the value #3 in the Destination Field for indicating that MS #3 is to be alerted for a simplex call connection or for a call transfer, depending on the current state (Idle or Conversation) of the MS 10. Also by example, depressing the keypad's "*" key results in the MS controller 18 generating the Alert Request Message with the predetermined code in the Message Qualifier Field, and the value #8 in the Destination Field for indicating that all MSs are to be alerted for a simplex call connection or for a call transfer, depending on the current state (Idle or Conversation) of the MS 10. If desired, some other key may also be depressed before (or simultaneously with) a numeric key (such as a menu soft key). This latter mode of operation may be useful if the user is expected to depress numeric keys during a normal call, such as when the user is prompted to enter information credit card or other information via the telephone's keypad 22. In either case, the MS controller 18 interprets the depression of one or more keys as a request for a simplex call connection or a call transfer, composes the Alert Request Message accordingly, and transmits same to the PB 5. The PB 5 in turn makes a determination whether a simplex call request or call transfer was requested, in accordance with a state of the MS 10 when the Alert Request Message was transmitted.

In a presently preferred embodiment the user depresses a numeric key and keeps the key depressed for some period of time that is greater than the time the user would normally depress the key when dialing or otherwise entering information. By example, keeping a numeric key depressed for several seconds is interpreted by the controller 18 as a request to initiate a call transfer to the MS that corresponds to the depressed numeric key.

Referring to FIG. 5, a description is now made of PB controller 30 processing for the case where the Alert Request Message, in combination with the current state of the MS 10, indicates that a simplex call request was made by the MS 10. At Block A the PB controller 30 transmits an Overhead Message to the MS 10 with an acknowledgement of the receipt of the Alert Request Message. At Block B the PB controller 30 examines the Destination field of the Alert Request Message to determine the MS with which the simplex call is to be established. The PB controller 30 composes an Overhead message to the identified MS that indicates that a simplex-type page is being performed. At Block C the PB controller 30 waits for some predetermined period of time (e.g., 20 seconds) for the identified MS to answer the page. If a timeout occurs in Block C control transfers to Block D where the PB controller disables its transmitter 32 and enters an Idle state.

Assuming now that the identified MS 10 responds to the simplex page at Block C, control passes instead to Block E where the PB controller 30 establishes a simplex connection between the originally requesting MS and the MS identified in the Destination field of the Alert Request Message.

If the Destination field was set to eight in the Alert Request Message, then all MSs 10 are alerted by the PB 5, and the one that first answers the alerting page is connected to the originating MS.

A simplex-type connection is preferred for this invention in that only one transmitter can be on at any given time in the MS transmitting channel. In this case the PB 5 transmits a signal that is received by both MSs, while only one MS is allowed to transmit at any given time. In this way a voice transmission is transmitted from, by example, the transmitter 14 of $MS_1$ to the receiver 34 of the PB 5. The voice transmission is then connected to the input of the PB transmitter 32 and is transmitted at a different frequency for reception by the receiver 16 of, by example, the $MS_3$.

Figure 7:
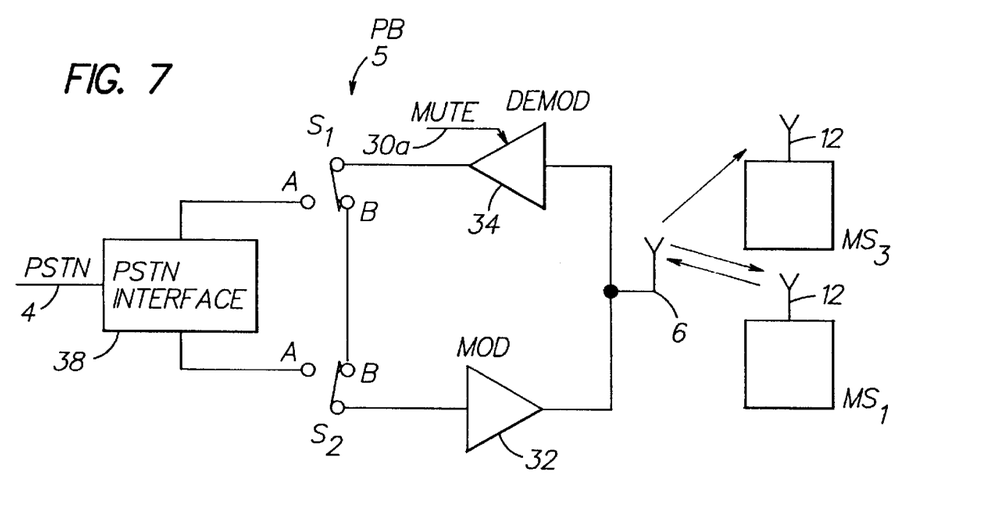
FIG. 7 is a block diagram of the PB showing a simplex connection between two MSs.

In this regard reference may be had to FIG. 7 which illustrates the PB 5 during a simplex connection between $MS_1$ and $MS_3$. During the simplex connection switches S1 and S2 are switched from position A (normal) to position B for coupling the receive audio path to the transmit audio path. In this case, and assuming that the $MS_1$ is transmitting, the transmission from $MS_1$ is routed from the output of the receiver/demodulator 34 through switches S1 and S2, through the modulator/transmitter 32, and is then transmitted from antenna 6 to both $MS_1$ and $MS_3$. The receive audio path can be selectively muted, if so desired, using the signal line 30a.

In order to eliminate switching noise due to, by example, the turning off of the MS transmitter 14 at the end of a voice transmission and/or the RF level in the receiver 16 dropping below some threshold level, it is preferred that the transmitting MS warns the PB beforehand (e.g., 100 ms before cutoff) that the signal will terminate. This can be accomplished by a change in a subaudible data stream, or by a wide band data message (e.g., in a system using AMPS channel spacing), or by a change in SAT frequency. The warning can also be given by a change in a presence/absence of SAT. By example only, the MS can simultaneously transmit a first continuous sub-audible bit stream (e.g., 010101 . . . ) during a transmitted voice segment, and then transmit a second sub-audible bit stream (e.g., 111 . . . ) before turning off the transmitter 14 at the termination of the voice segment. The determination of when to change the transmission of the sub-audible bit stream from the first to the second can be made by a voice activity (VAC) function (18b) performed by the MS controller 18, or by the user pressing a predetermined key, such as a keypad key, only when talking. The PB controller 30 is responsive to the sub-audible bit stream to mute the PB's receiver 34 with signal line 30a just prior to the MS controller 18 turning off the transmitter 14 with signal line 18a, thereby preventing any switching or other noise from being transmitted through to the other MS.

Figure 6:
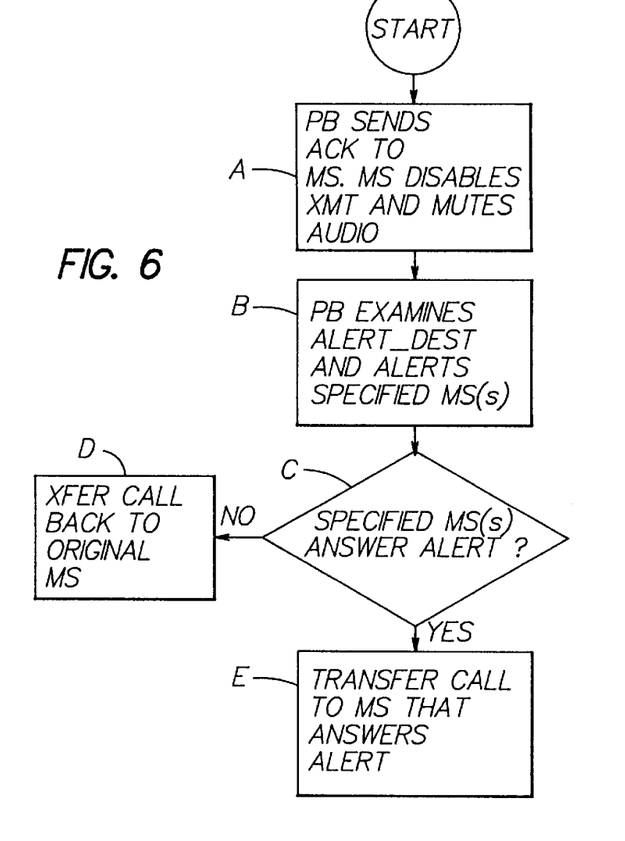
FIG. 6 is a logic flow diagram illustrating an in-building call transfer method in accordance with this invention.

Referring to FIG. 6, a description is now made of PB controller 30 processing for the case where the Alert Request Message, in combination with the current state of the MS 10, indicates that a call transfer request was made by the MS 10. At Block A the PB controller 30 transmits an Overhead Message to the MS 10 with an acknowledgement of the receipt of the Alert Request Message. In response to the receipt of the acknowledgement, the MS 10 disables its transmitter 14 and mutes its audio circuits. At Block B the PB controller 30 examines the Destination field of the Alert Request Message to determine the MS to which the call is to be transferred. The PB controller 30 composes an Overhead message to the identified MS that indicates that a call transfer is being performed. At Block C the PB controller 30 waits for some predetermined period of time (e.g., 20 seconds) for the identified MS to answer the call transfer page. If a timeout occurs in Block C, control transfers to Block D where the PB controller may transfer the call back to the originating MS 10.

In this regard it should be noted that call transfer can be done for all of the MSs. In this case if all MSs continue "ringing" for an extended period of time, it should become obvious to the originator that the call cannot be transferred. In this case the user can depress, by example, the SEND key of the originating MS, and the call is then transferred back to the originating MS by the PB.

Thus, an unsuccessful call transfer can be handled by either automatically transferring the call back to the originating MS after some predetermined period (as in Block D of FIG. 6), or by alerting all MSs and thus allowing the originating (or any other) MS to pick up the call.

Assuming now that the identified MS 10 responds to the call transfer page at Block C, control passes to Block E where the PB controller 30 connects the ongoing call to the MS identified in the Destination field of the Alert Request Message.

As for the simplex call case, if the Destination field was set to eight in the Alert Request Message, then all MSs 10 are alerted by the PB 5, and the one that first answers the alerting page is connected to the currently connected call. In that all MSs are alerted simultaneously, it is assumed that the originating MS 10 will not answer the alerting page.

If the user inadvertently specifies a MS number that does not exist in the local system (e.g., the PB 5 has a record of $MS_1-MS_{41}$ and the user depresses the #5 key), then the PB 5 preferably addresses the alerting page back to the originating MS. In this manner the originating MS 10 can become aware that the specified MS does not exist or is otherwise not available. In this regard the PB 5 also checks the memory 36 to see if the specified MS is currently registered with the PB and, if not, can also direct the alerting page back to the originating MS.

It should be noted with regard to the embodiments of both FIGS. 5 and 6 that the "current state" of the MS 10 may be interpreted by the PB 5 as being the state of the MS 10 either before or after sending the message. For example, in the AMPS system there are at least three different tasks or states: idle, system access, and conversation. For the WRE system there are at least four different tasks or states: idle, link, alert audio state, and conversation. For the AMPS case, when the MS 10 sends a message from the idle state to the PB 5, the MS 10 first enters the system access task. For the WRE case, when the MS 10 sends a message from the idle state to the PB 5, the MS 10 first enters the link task. In either case the PB 5 can interpret the receipt of the message as indicating that the MS 10 is (or was) in the idle state, although another defined state was required to be entered in order to actually transmit the message.

With regard to the audio alert state, the MS 10 is being alerted for a call, but does not yet have its transmitter on. For the call transfer case described above, the first MS 10 to turn on its transmitter can be provided with the connection by the PB 5. Although this is not a conversation state per se, it is also clearly not an idle state.

The conversation state is more clear-cut, in that the MS 10 has its transmitter on, is connected to the PSTN 4 through the PB 5, and data messages flow between the MS 10 and the PB 5 during the call.

As employed herein, therefore, the "idle state" can be considered a MS state other than the conversation state, and the "conversation state" can be considered a MS state other than the idle state. More particularly with regard to the idle state, the MS 10 can be considered to be in the idle state if the MS was in idle before entering the task necessary for sending the message, or if the MS is in idle after sending the message. The idle state can thus be identified just before or just after the message-sending task.

With regard to the determination of the state of the MS 10, PB 5 connects the call to the MS 10 and accepts call originations from the MS 10. When the conversation state is created, the PB 5 assumes that the MS 10 is in the conversation mode, so long as the call has not been released by the PB 5 or MS 10, and a specified signal has been received from the MS 10 during some predetermined time period. By example, and for the AMPS case, if the SAT signal has not been received from the MS 10 during, for example, the last 10 seconds, the PB 5 assumes that the connection to the MS 10 is lost and the conversation state is terminated. Further by example, and for the IS-91-A WRE case, if the subaudible data stream is not received for some period of time the conversation state is terminated (e.g., if the PB 5 misses 10 consecutive messages transmitted by the MS 10, the PB 5 enters the idle task).

Although described above in the context of an Alert Request Message wherein a single code is used to specify one of two types of operations, as a function of the state of the MS, it should be realized that two separate codes could be used. In this case the MS 10 may select the appropriate code when composing the Alert Request Message, the selection being made in response to data input by the user and/or in response to the state of the MS when the user request is made.

Furthermore, in some systems it may be desirable to provide only the call transfer capability, while in other systems to provide only the simplex calling capability.

Also, and as was described above, a number of mechanisms, other than a sub-audible bit stream, can be employed for informing the PB 5 of when the MS 10 is about to turn off its transmitter 14.

Furthermore, the mobile stations can use one or more of a number of different mechanisms for alerting a user of a call transfer or simplex call, including auditory, visual, and tactile indicating mechanisms.

Although not a limitation on the practice of this invention, it should be noted that the PB 5 may typically have only one simultaneously active receiving and transmitting channel. As such, in the WRE environment the call is transferred from one MS to another MS while continuing on the same channel (or at least the first connection is released before the connection is transferred to the other MS, even though the channel may be different). Furthermore, and since there may be only one receiver and transmitter available in the PB 5, the simplex-type of call connection is preferred between two MSs. However, if several channels are available, then one receive/transmit channel pair can be allocated to one MS and a second receive/transmit channel pair can be allocated to another MS, and a duplex connection established through the PB 5.

It should further be appreciated that in some systems there may be but two MSs available. In this case it may not be desirable to explicitly specify the identity of the second handset when requesting a call transfer or simplex call connection. That is, in this case the identity of the other MS is defaulted to the MS that is not making the request.

Thus, while the invention has been particularly shown and described with respect to preferred embodiments thereof, it will be understood by those skilled in the art that changes in form and details may be made therein without departing from the scope and spirit of the invention.

What is claimed is:

1. A method of operating a wireless communications system having at least one base station and a plurality of mobile stations capable of wireless communications with the at least one base station, comprising the steps of:

in response to input from a user of a first mobile station, transmitting a message from the first mobile station to the base station, the message including a request for service;

receiving the message at the base station and interpreting the request for service as being one of a first type of request and a second type of request in accordance with a state of the first mobile station at a time that the message was transmitted; and performing the requested service in cooperation with at least one second mobile station.

2. A method as set forth in claim 1, wherein the message further includes information specifying an identity of at least one second mobile station.

3. A method as set forth in claim 2, wherein the first type of request is a request to establish a connection between the first mobile station and the specified at least one second mobile station.

4. A method as set forth in claim 2, wherein the second type of request is a request to transfer an on-going call from the first mobile station to the specified at least one second mobile station.

5. A method as set forth in claim 2, wherein the request for service is interpreted as a request to establish a simplex connection between the first mobile station and the specified at least one second mobile station, when the first mobile station is in an idle state; and wherein the request for service is interpreted as request to transfer an on-going call from the first mobile station to the specified at least one second mobile station, when the first mobile station is in a conversation state.

6. A method as set forth in claim 2, wherein the first type of request is a request to establish a simplex connection between the first mobile station and the specified at least one second mobile station, and wherein one of the mobile stations transmitting to the other mobile station through the base station also transmits an indication of when a transmitter of the mobile station will be turned off.

7. A method as set forth in claim 6, wherein the indication is transmitted as a sub-audible bit stream having a first bit pattern during the transmission and a second bit pattern just prior to the transmitter being turned off.

8. A method as set forth in claim 7, wherein the base station is responsive to the second bit pattern for muting a connection between base station receiver and transmitter audio paths.

9. A method as set forth in claim 1, wherein the base station has one transmitter and one receiver.

10. A method of operating a wireless communications system having at least one personal base station and a plurality of mobile stations capable of wireless communications with the at least one personal base station, comprising the steps of:

in response to input from a user of a first mobile station, transmitting a message from the first mobile station to the personal base station, the message including a request for service;

receiving the message at the personal base station and interpreting the request for service as a request to establish a simplex connection between the first mobile station and another mobile station, when the first mobile station is in an idle state when making the request, and interpreting the request for service as a request to transfer an on-going call from the first mobile station to another mobile station, when the first mobile station is in a conversation state when making the request; and contacting at least one other mobile station from the personal base station for one of establishing the simplex connection and transferring the on-going call.

11. A method as set forth in claim 10, wherein the message further includes information specifying another mobile station.

12. A method as set forth in claim 10, wherein the during a simplex connection a transmitting mobile station transmits a sub-audible bit stream having a first bit pattern during the transmission and transmits a second bit pattern just prior to a transmitter of the mobile station being turned off, and wherein the personal base station is responsive to the second bit pattern for muting a connection between a personal base station receiver audio path and a base station transmitter audio path.

13. A method as set forth in claim 10, wherein the personal base station has one transmitter and one receiver.

14. A method of operating a wireless communications system having at least one personal base station and a plurality of mobile stations capable of wireless communications with the at least one personal base station, comprising the steps of:

in response to input from a user of a first mobile station, transmitting a message from the first mobile station to the personal base station, the message including a request for service;

receiving the message at the personal base station and interpreting the request for service as a request to establish a simplex connection between the first mobile station and another mobile station, when the first mobile station is in an idle state when making the request, and interpreting the request for service as a request to transfer an on-going call from the first mobile station to another mobile station, when the first mobile station is in a conversation state when making the request; and contacting at least one other mobile station from the personal base station for one of establishing the simplex connection and transferring the on-going call, wherein the message further specifies a plurality of other mobile stations, wherein the personal base station pages a plurality of other mobile stations, and wherein the simplex connection or the transfer of the on-going call is made with the first mobile station to answer the page.

15. A wireless communications system, comprising:

at least one personal base station and a plurality of mobile stations capable of wireless communications with the at least one personal base station;

individual ones of said mobile stations including means, responsive to input from a user, for composing and transmitting a message to the personal base station, the message including a request for service;

said personal base station comprising means for receiving the message from the transmitting mobile station and for interpreting the request for service as a request to establish a simplex connection between the transmitting mobile station and another mobile station, when the transmitting mobile station is in an idle state when making the request, and interpreting the request for service as a request to transfer an on-going call from the transmitting mobile station to another mobile station, when the transmitting mobile station is in a conversation state when making the request;

said personal base station further comprising means for transmitting a message to at least one other mobile station for one of establishing the simplex connection and transferring the on-going call.

16. A system as set forth in claim 15, wherein the message further includes information specifying another mobile station.

17. A system as set forth in claim 15, wherein during a simplex connection a mobile station transmits a subaudible bit stream having a first bit pattern during a voice transmission and transmits a second bit pattern just prior to a transmitter of the mobile station being turned off, and wherein said personal base station is responsive to the second bit pattern for muting a connection between a personal base station receiver audio path and a base station transmitter audio path.

18. A system as set forth in claim 15, wherein the personal base station has one transmitter and one receiver.

19. A wireless communications system, comprising:

at least one personal base station and a plurality of mobile stations capable of wireless communications with the at least one personal base station;

individual ones of said mobile stations including means, responsive to input from a user, for composing and transmitting a message to the personal base station, the message including a request for service;

said personal base station comprising means for receiving the message from the transmitting mobile station and for interpreting the request for service as a request to establish a simplex connection between the transmitting mobile station and another mobile station, when the transmitting mobile station is in an idle state when making the request, and interpreting the request for service as a request to transfer an on-going call from the transmitting mobile station to another mobile station, when the transmitting mobile station is in a conversation state when making the request;

said personal base station further comprising means for transmitting a message to at least one other mobile station for one of establishing the simplex connection and transferring the on-going call, wherein the message further specifies a plurality of other mobile stations, wherein the personal base station pages a plurality of other mobile stations, and wherein the simplex connection or the transfer of the on-going call is made with the first mobile station to answer the page.

20. A method of operating a wireless communications system having at least one base station and a plurality of mobile stations capable of wireless communications with the at least one base station, comprising the steps of:

in response to input from a user of a first mobile station, transmitting a message from the first mobile station to the base station, the message including a request for service; and receiving the message at the base station and interpreting the request for service as being a request to establish a connection between the first mobile station and at least one second mobile station.

21. A method as set forth in claim 20, wherein the message further includes information specifying at least one second mobile station.

22. A method as set forth in claim 21, wherein the request for service is interpreted as a request to establish a simplex connection between the first mobile station and the specified at least one second mobile station, and further comprising a step of coupling a receive audio path of the base station to a transmit audio path of the base station.

23. A method as set forth in claim 20, and wherein one of the mobile stations transmitting to the other mobile station through the base station also transmits an indication of when a transmitter of the mobile station will be turned off.

24. A method as set forth in claim 23, wherein the indication is transmitted as a sub-audible bit stream having a first bit pattern during the transmission and a second bit pattern just prior to the transmitter being turned off.

25. A method as set forth in claim 24, wherein the base station is responsive to the second bit pattern for muting a connection between a base receiver audio path and a base station transmitter audio path.

26. A method as set forth in claim 23, wherein the indication is transmitted as a wide bandwidth data message.

27. A method as set forth in claim 23, wherein the indication is transmitted as a change in a Supervisory Audio Tone (SAT) frequency.

28. A method as set forth in claim 23, wherein the indication is transmitted as a change in a presence or absence of a Supervisory Audio Tone (SAT).

29. A method as set forth in claim 20, wherein the input from the user of the first mobile station is made by depressing a selected keypad key for a predetermined period of time, the selected keypad key specifying at least one second mobile station.

30. A method as set forth in claim 20, wherein the base station has one transmitter and one receiver.

31. A method of operating a wireless communications system having at least one base station and a plurality of mobile stations capable of wireless communications with the at least one base station, comprising the steps of:

in response to input from a user of a first mobile station, transmitting a message from the first mobile station to the base station, the message including a request for service; and receiving the message at the base station and interpreting the request for service, in accordance with a state of the first mobile station when the message was transmitted, as being either a first type of request to transfer an on-going call from the first mobile station to at least one second mobile station or a second type of request to connect the first mobile station to a second mobile station.

32. A method as set forth in claim 31, wherein the message further includes information specifying at least one second mobile station.

33. A method as set forth in claim 31, wherein the input from the user of the first mobile station is made by depressing a selected keypad key for a predetermined period of time, the selected keypad key specifying at least one second mobile station.

34. A method as set forth in claim 32, and for the first type of request further comprising the steps of:
   sending a message from the base station to the at least one specified second mobile station for causing the at least one specified second mobile station to generate an alerting indicator; and
   transferring the call when a user responds to the alerting indicator.

35. A method as set forth in claim 32, and for the first type of request further comprising the steps of:
   sending a message from the base station to the at least one specified second mobile station for causing the at least one specified second mobile station to generate an alerting indicator;
   waiting for a period of time for a user respond to the alerting indicator;
   if the user does not respond to the alerting indicator, sending a message from the base station to the first mobile station for causing the first mobile station to generate an alerting indicator; and
   transferring the call back to the first mobile station when the user of the first mobile station responds to the alerting indicator.

36. A method of operating a wireless communications system having at least one base station and a plurality of mobile stations capable of wireless communications with the at least one base station, comprising the steps of:
   in response to input from a user of a first mobile station, transmitting a message from the first mobile station to the base station, the message including a request for service; and
   receiving the message at the base station and interpreting the request for service as being a request to transfer an on-going call from the first mobile station to at least one second mobile station;
   wherein the message further includes information specifying at least one second mobile station;
   and further comprising the steps of,
   sending a message from the base station to the at least one specified second mobile station for causing the at least one specified second mobile station to generate an alerting indicator;
   waiting for a period of time for a user respond to the alerting indicator;
   if the user does not respond to the alerting indicator, sending a message from the base station to a plurality of mobile stations for causing each of the plurality of mobile stations to generate an alerting indicator; and
   transferring the call to the first one of the plurality of mobile stations that responds to the alerting indicator.

37. A mobile station for use in a wireless communications system that includes at least one base station, said mobile station comprising:
   a user interface; and
   means, coupled to said user interface and responsive to input from a user, for composing and transmitting a message to the base station, the message specifying at least one of a request to establish a simplex connection with another mobile station and a request to transfer an on-going call to another mobile station.

38. A mobile station as set forth in claim 37, wherein the message further includes information for specifying another mobile station with which to establish the simplex connection or to which to transfer the call.

39. A base station for use in a wireless communications system that includes a plurality of mobile stations, said base station comprising:
   means for receiving a message transmitted from a mobile station;
   means for interpreting the received message as one of a request to establish a simplex connection between the mobile station and another mobile station and a request to transfer an on-going call from the mobile station to another mobile station; and
   means for transmitting a message to at least one other mobile station for one of establishing the simplex connection and transferring the on-going call.

40. A base station as set forth in claim 39, wherein said interpreting means is responsive to the mobile station being in an idle state for interpreting the message as a request to establish the simplex connection, and is further responsive to the mobile station being in a conversation state for interpreting the message as a request to transfer the on-going call.

41. A base station as set forth in claim 39, wherein the base station is further comprised of one transmitter and one receiver for communicating with said plurality of mobile stations.

42. A mobile station for use in a wireless communications system that includes at least one base station, said mobile station comprising a transmitter and further comprising:
   a user interface;
   means, coupled to said user interface and responsive to input from a user, for composing and transmitting a message to the base station for requesting a simplex call connection to another mobile station operable with said base station; and
   transmitter control means, coupled to said transmitter, for turning said transmitter off and on during a simplex call conversation state.

43. A mobile station as set forth in claim 42, wherein said transmitter control means is responsive to a voice signal received from a microphone of the mobile station for turning said transmitter off and on during the simplex call conversation state.

44. A mobile station as set forth in claim 42, wherein said transmitter control means is responsive to a key depression for turning said transmitter off and on during the simplex call conversation state.

45. A mobile station as set forth in claim 44, wherein said key is at least one key of a keypad that comprises a portion of said user interface.

46. A mobile station as set forth in claim 42, wherein said mobile station further comprises means for transmitting an indication to said base station that said transmitter is to be turned off.

47. A base station for use in a wireless communications system that includes a plurality of wireless handsets, said base station comprising a receiver audio path and a transmitter audio path and further comprising:

means for receiving a message transmitted from an originating wireless handset;

means for interpreting the received message as a request to establish a simplex connection between the originating wireless handset and a second wireless handset authorized to operate with the base station; and     means for alerting the second wireless handset and, in response to the second wireless handset responding to the alert, for establishing a simplex call connection between the originating wireless handset and the second wireless handset by coupling together said receiver and transmitter audio paths.

48. A base station as set forth in claim 47, wherein said base station further comprises means for muting an audio connection between said receiver and transmitter audio paths in response to a message received from one of said originating and second wireless handsets.

49. A base station for use in a wireless communications system that includes a plurality of wireless handsets, said base station comprising:

means for receiving a message transmitted from an originating wireless handset;

means for interpreting the received message, in accordance with a state of the originating wireless handset when the message was transmitted, as a first type of request to make a connection between the originating wireless handset and a second wireless handset authorized to operate with the base station or as a second type of request to make a call transfer between the originating wireless handset and a second wireless handset authorized to operate with the base station;

means for alerting the second wireless handset and, in response to the second wireless handset responding to the alert, for the second type of request transferring a call that is currently connected to the originating wireless handset to the second wireless handset; and     means for determining that the second wireless handset is currently registered with the base station prior to alerting the second wireless handset; wherein     if the second wireless handset is determined to not be currently registered with the base station, for the case of the second type of request the base station sends an alerting message back to the originating wireless handset so that the call can be transferred back to the originating wireless handset.

\* \* \* \* \*